United States Patent [19]
Parker et al.

[11] Patent Number: 5,453,840
[45] Date of Patent: Sep. 26, 1995

[54] CROSS CORRELATION IMAGE SENSOR ALIGNMENT SYSTEM

[75] Inventors: Martin A. Parker, Penfield; Kenneth A. Parulski, Rochester, both of N.Y.

[73] Assignee: Eastman Kodak Company, Rochester, N.Y.

[21] Appl. No.: 190,714

[22] Filed: Jan. 27, 1994

Related U.S. Application Data

[63] Continuation of Ser. No. 712,865, Jun. 10, 1991, abandoned.
[51] Int. Cl.$^6$ .......................... G01B 11/00; H04N 17/02
[52] U.S. Cl. .......................... 356/400; 348/188; 348/263
[58] Field of Search ................... 356/399–401; 358/51, 10, 75; 382/34, 44; 348/188, 263

[56] References Cited

U.S. PATENT DOCUMENTS

| | | | |
|---|---|---|---|
| 2,787,188 | 4/1957 | Berger . | |
| 3,848,096 | 11/1974 | Marko | 359/24 |
| 4,388,641 | 6/1983 | Yamamoto et al. | 358/51 |
| 4,499,488 | 2/1985 | White et al. | 358/51 |
| 4,667,227 | 5/1987 | Ikeda | 358/75 |
| 4,709,260 | 11/1987 | Geerts et al. | 358/51 |
| 4,755,876 | 7/1988 | Dangler | 358/264 |
| 4,811,114 | 3/1989 | Yamamoto et al. | 358/280 |
| 4,823,187 | 4/1989 | Toyama et al. | 358/51 |
| 4,835,600 | 5/1989 | Harada et al. | 358/51 |
| 5,113,247 | 5/1992 | Akiyama et al. . | |

FOREIGN PATENT DOCUMENTS

| | | | |
|---|---|---|---|
| 0115780 | 1/1984 | European Pat. Off. | H04N/9/04 |
| 0231382 | 6/1986 | European Pat. Off. | H04N/9/093 |
| 0350794 | 7/1989 | European Pat. Off. | H04N/9/093 |
| 0427436 | 10/1990 | European Pat. Off. | H04N/9/093 |
| 197710 | 10/1977 | U.S.S.R. | 356/400 |
| 2203919 | 4/1988 | United Kingdom | H04N/9/093 |
| WO-A-9010994 | 3/1990 | WIPO | H04N/9/093 |

OTHER PUBLICATIONS

Mimura, "New Registration Error Detecting System for 3-tube HDTV Camera", Society of Motion Picture and Television Engineers, pp. 1–18 Oct. 1990.

Pratt, "Correlation Techniques of Image Registration," IEEE Transactions on Aerospace and Electronic Systems, vol. AES 10, #3, May 1974 pp. 353–358.

Wagner et al, "Computerized CCD–Camera Registration Measurement Unit" RCA Review, vol. 47, Jun. 1986, pp. 203–225.

Barnea et al, "A Class of Algorithums for Fast Digital Image Registration", IEEE Transactions on Computers, vol. C–21, #2, Feb. 1972.

W. K. Pratt, "Digital Image Processing", 1978.
W. K. Pratt, "Digital Image Processing", 1991.

(List continued on next page.)

*Primary Examiner*—Richard A. Rosenberger
*Assistant Examiner*—K. P. Hantis
*Attorney, Agent, or Firm*—David M. Woods

[57] ABSTRACT

A system which uses a random noise test target 16 to align sensors 10 and 12 by performing mathematical cross correlations between sensors 10 and 12. The system 48 includes a computer 58 rotating one of the images, computing a correlation between the rotated image and a reference image and determining the peak in the correlation. A global maximum is used to interpolate a true subpixel peak. The interpolated rotational cross correlation peak is used to determine values of two dimensional and rotational movement of one of the sensors 10 and 12 necessary to align the sensors. The values are used to move the sensor 10 or 12 and it is fixed in place. Once the sensors have been aligned and fixed in place, the system 118 computes the cross correlation of segments of the image to determine delay values and an interpolation filter coefficient values which are stored in a permanent storage device 120. The coefficients are used by an correction circuit 122 to correct for regional or spatially varying alignment errors during real time image processing by the imaging system.

15 Claims, 11 Drawing Sheets

OTHER PUBLICATIONS

J. Ward and D. R. Cok, "Resampling Algorithms for Image Resizing and Rotation", SPIE Proceedings, vol. 1075, *Digital Image Processing Applications*, pp. 260–269, 1989.

T. M. Wagner and E. C. Fox, "Computerized CCD–Camera Registration Measurement Unit", RCA Review, vol. 47, Jun. 1986, pp. 203–225.

Gonzales & Wintz, Digital Image Processing, Addison–Wesley, pp. 66–71.

Oppenheim et al., Signals and Systems, Prentice–Hall, pp. 75–87.

Itaru Mimura, Naoto Tomura and Nobuo Murata, "New Registration Error Detecting system for 3–tube HDTV Camera", pp. 1–17.

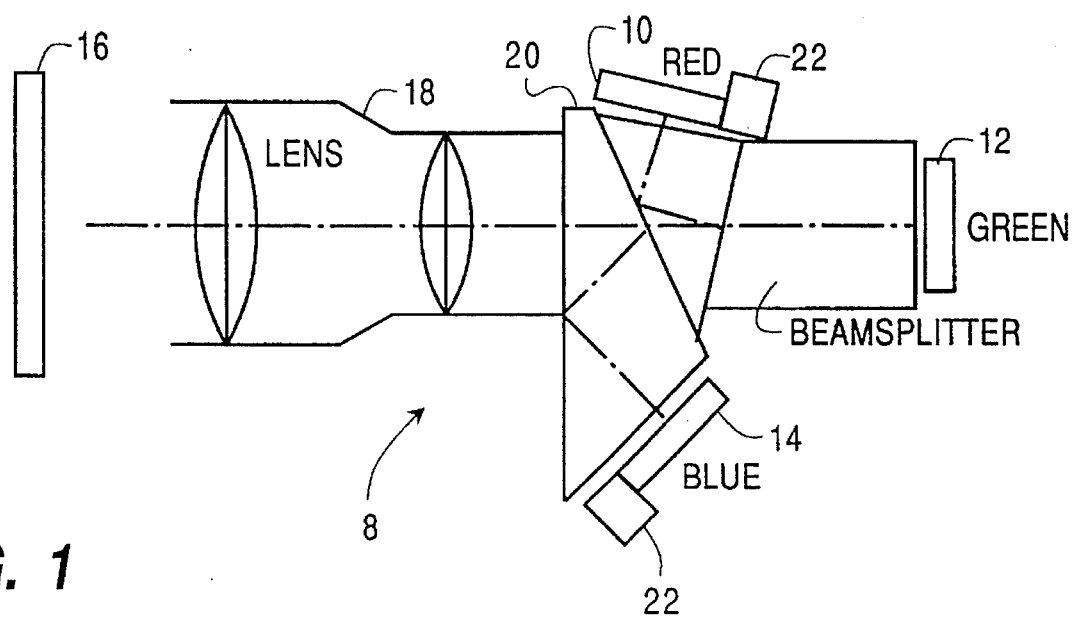
FIG. 1
FIG. 3
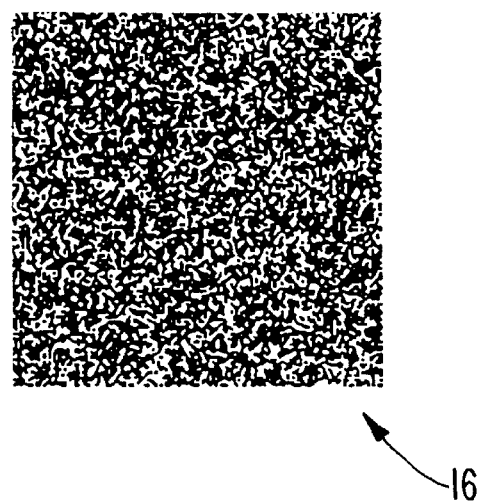

CROSS CORRELATION IMAGE SENSOR ALIGNMENT SYSTEM

This is a continuation of application Ser. No. 07/712,865, filed Jun. 10, 1991, now abandoned.

BACKGROUND OF THE INVENTION

1. Field of the Invention

The present invention is directed to a system that automatically aligns two or more sensors using the cross correlation of the images sensed by the sensors and thereafter electronically corrects for spatially varying misregistration errors and, more particularly, to a system that achieves subpixel alignment by using a rotational mathematical cross correlation with interpolation or peak hunting to find the position of highest correlation, thereby determining the misregistration, and to move the sensors into place based on the position of highest correlation and then correct for regionally located, spatially varying misregistration errors caused by chromatic aberrations in a lens system providing the image to the sensors.

2. Description of the Related Art

In multiband or multicolor imaging systems in which two or more image sensors are placed behind an optical beam splitter, the sensors must be aligned relative to each other in the imaging plane so that they sample the image in the correct or same location. Usually one sensor, called the reference sensor, is fixed in the image plane and the others are aligned to it. Two approaches are typically taken to align such multi-sensor imaging systems. In the first optical approach, an operator uses special magnifying optics to look into the entrance face of the beam splitter and align reference registration marks, bonding pads or other suitable features on the sensors to those on the reference. A second, active approach is to have the system operating and imaging a test scene which includes registration marks. While watching a monitor or other visual display, the sensor under alignment is adjusted by an operator until images are brought into proper registration or waveforms have the proper qualities. Both of these approaches can be automated to some degree.

SUMMARY OF THE INVENTION

It is an object of the present invention to produce automatic sensor alignment using a mathematical cross correlation between the images produced by two or more sensors.

It is another object of the present invention to provide automatic subpixel alignment of the sensors.

It is also an object of the present invention to provide rotational alignment of the sensors automatically.

It is a further object of the present invention to correct spatially varying alignment errors between aligned sensors.

The above objects can be attained with a system using a random noise test pattern to align sensors by performing mathematical cross correlations between rotated images produced by the sensors. The rotational cross correlation is used to determine amounts of translational and rotational movement of one of the sensors necessary to align the sensors. Once the sensors have been aligned and fixed in place, the system computes the cross correlation of regional segments of the image to determine delay and interpolation filter coefficients values. The coefficients are used to correct for regional or spatially varying alignment errors.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWING

FIG. 1 illustrates an imaging system with sensors 10, 12 and 14 to be aligned using a test target 16 in accordance with the present invention;

FIG. 3 illustrates a sensor alignment target 16 according to the present invention;

DESCRIPTION OF THE PREFERRED EMBODIMENTS

Figure 2:
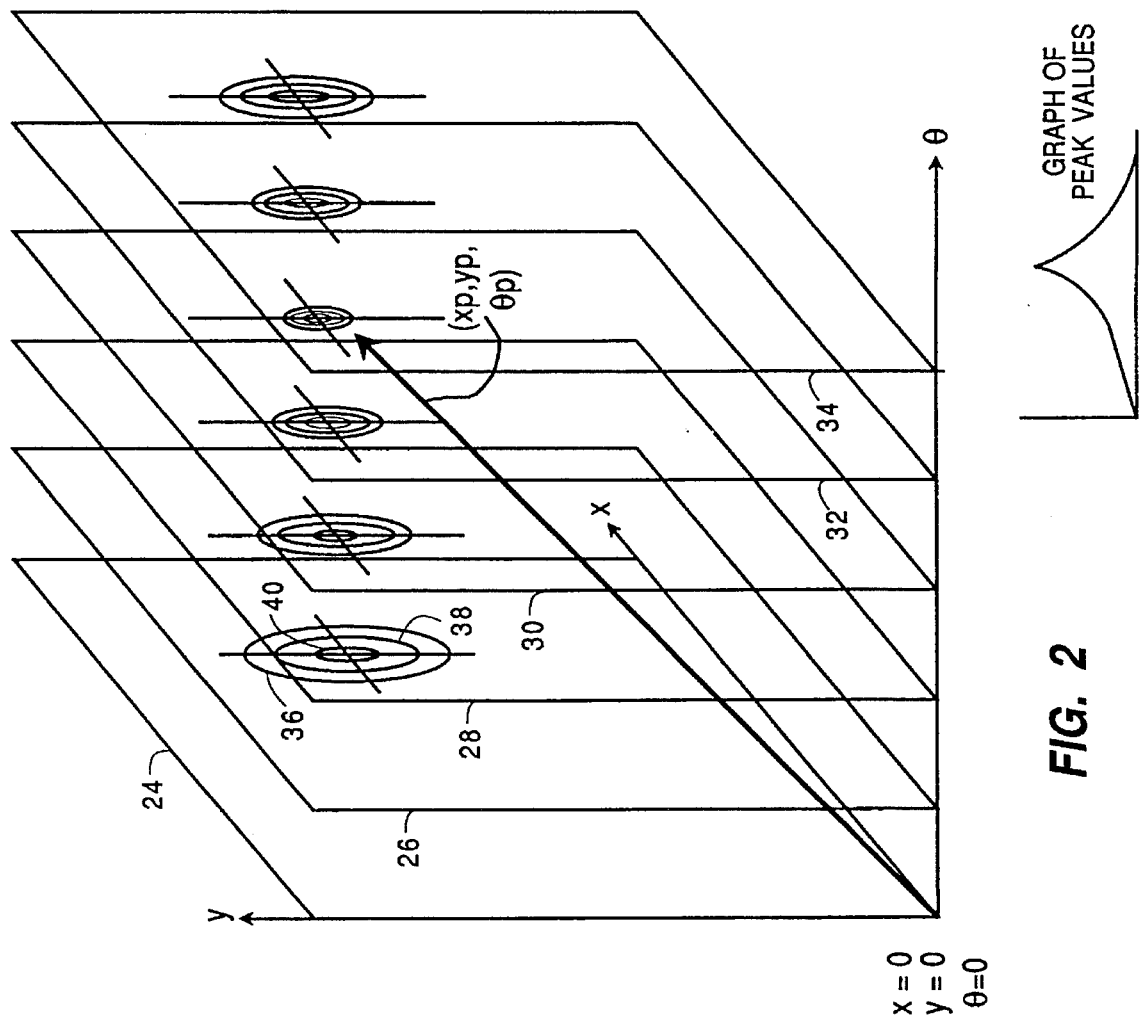
FIG. 2 depicts a cross correlation operation as performed by the present invention.

The present invention is a system in which sensors are aligned in situ automatically and with a high degree of accuracy. The system projects an image of a specially designed test target onto the sensors to be aligned through the optics which will be used by the imaging system. The target is easy to produce, does not require precision features, and is formed on an appropriate test target medium, such as paper. The system then computes a cross correlation of image data from the sensor fixed in place, called the reference sensor, and the sensor being aligned with the reference sensor. The location of the peak in the cross correlation function provides two dimensional information concerning the translational alignment of the sensor being aligned relative to the reference sensor. Rotational misalignment is determined by computing a series of such cross correlations in which one image is rotated mathematically in defined increments through the presumed alignment position. The cross correlation with the highest peak is closest to the correct rotational position. A more precise (i.e., subpixel) alignment can be achieved by either interpolating the cross correlation function outputs or by a peak hunting process. Once the sensor is fixed in place, based on the highest cross correlation function peak, further cross correlation functions can be computed for small regions of the sensor image being aligned to determine spatially varying misalignments or errors caused by optical aberrations in the lens system of the imaging system. The results of the regional cross correlations are used to produce coefficients for delaying and two dimensionally interpolating the sensor signal outputs to reduce spatially varying misregistration errors.

FIG. 1 illustrates an adjustment test bed 8 used for aligning red 10, green 12, and blue 14 sensors and fixing them in place. In this figure it is assumed that the green sensor 12 is the fixed or reference sensor although the red 10 or blue 14 sensor could alternately be used as the reference. The system includes a special alignment target 16 the image of which passes through a lens 18 and a beam splitter 20 which could be the optics for the final device, such as a camera. The sensors 10, 12 and 14 are positioned at the three exit faces of the beam splitter 20 so that they lay in the same image plane. Since the focus of the sensors are in the same plane of the image and have no tilt (the tilt being removed prior to alignment), the remaining degrees of freedom for sensor misalignment are X and Y (translational) and $\phi$ (rotational). After the reference sensor, for example, the green sensor 12 has been fixed in position, by for example gluing it to the beam splitter 20, the other two sensors 10 and 14 must be aligned precisely, so that they sample the same locations of the target 16, or the resulting color image will appear misaligned. The adjustments to the positions of sensors 10 and 14 are performed by a movement control system which will be discussed in more detail with respect to FIG. 2, and which includes motors 22 for all three degrees of freedom which are used to move the sensors into a position which minimizes the misregistration errors.

The present invention is based on the recognition by the inventors hereof that the discrete mathematical cross correlation function of the image data of the reference sensor 12 and the sensor under alignment (10 or 14) provides an accurate state-of-alignment metric. The discrete, 2-dimensional cross correlation of two stationary signals, f(x,y) and g(x,y) is defined as:

$$c(x,y) = f(x,y) \circ g(x,y) = \sum_{m=-\infty}^{\infty} \sum_{n=-\infty}^{\infty} f(m,n) g(x+m, y+n) \quad (1)$$

If $f(x,y) = g(x,y)$ then $c(x,y)$ is known

If f(x,y)=g(x,y) then c(x,y) is known as the autocorrelation function. Further if c(x,y)=0 for x,y≠0, then f(x,y) is white noise with zero mean and c(x,y)=I$\beta$(x,y), where I is a constant related to the value of the power spectrum of f(x,y) at all frequencies.

In practice, since there are a finite number of pixels in a sensor, the periodic cross correlation is computed. Given two sensor images f(x,y) and g(x,y), each of size K,L, two zero-padded sequences are formed, $f_p(x,y)$ and $g_p(x,y)$ each of size M, N, where M=2K-1, N=2L-1, then:

$$f_p(x,y) = \begin{cases} f(x,y) & 0 \leq x \leq K-1, 0 \leq y \leq L-1 \\ 0 & K \leq x \leq M-1, L \leq y \leq N-1 \end{cases} \quad (2)$$

$$g_p(x,y) = \begin{cases} g(x,y) & 0 \leq x \leq K-1, 0 \leq y \leq L-1 \\ 0 & K \leq x \leq M-1, L \leq y \leq n-1 \end{cases} \quad (3)$$

The periodic cross correlation is defined as:

$$c_p(x,y) = f_p(x,y) \circ g_p(x,y) = \sum_{m=0}^{M-1} \sum_{n=0}^{N-1} f_p(m,n) g_p(x+m, y+n) \quad (4)$$

Zero-padding of the sensor data sequences assures that there is no wraparound error in $c_p(x,y)$ associated with the periodicity of the function. If f(x,y)=g(x,y) and g(x,y) is a zero-mean white noise sequence, then $c_p(x,y)$ would not necessarily be 0 for x,y=0, but $c_p(0,0)$ would be the maximum value of $c_p(x,y)$ and $c_p(x,y)$ would approach I$\beta$(m,n) for large K and L. If f(x,y) and g(x,y) are pixel values from two ideal area image sensors, and each sensor samples exactly the same locations of a white noise image without loss of optical or electrical bandwidth, then the cross correlation, $c_p(x,y)$ has a peak value at x=y and approaches I$\beta$(x,y) for large K and L. If the two sensors are translated relative to one another, then the peak of $c_p(x,y)$ would translate in a manner similar to the sensors. Thus, the peak of the cross correlation function, given the appropriate image target, can be used to identify the relative translation between the image sensors.

If the two sensors are both rotated and translated with respect to one another, then the peak of the cross correlation function would be not only translated, but also diminished in amplitude and broadened, since the rotation would have the effect of uncorrelating the signals, especially at points away from the axis of rotation. However, if one of the images is prerotated mathematically in increments that brings the resulting image through the point of zero rotation with respect to the other, and if the cross-correlation is performed between the reference and the prerotated images for each angular increment, then through the sequence, the amplitude of the cross correlation peak would increase, reach a maximum in the vicinity of perfect rotational alignment, and diminish again. This sequence is illustrated in FIG. 2 as a three dimensional space. FIG. 2 shows the two dimensional cross correlation amplitude values for six rotational increments, that is, six slices 24–34 through the rotational cross correlation. Each slice shows equal amplitude contours of the translational cross correlation. For example, slice 24 shows three equal amplitude contours 36–40. As the rotational correlation progresses through to approximately the fourth slice 30, the contours move closer together so that the slope of the cross correlation function progresses toward a spike or impulse curve and the maximum value of the slice increases. The global maximum of the rotational cross correlations is the point of the rotation and translation required to align the sensors with the least misregistration error. With this sequence of processing steps, a vector is computed which indicates the degree of rotation and translation of the two sensors with respect to each other necessary for the best alignment. If the true axis of rotation of the sensors is not the same as that of the mathematical rotation, then the vector would need to be transformed from the mathematical x,y,$\theta$ coordinates to the sensor x',y', and $\theta$ coordinates.

When the sensors are mounted in an alignment system in which the translation and rotation of the sensors relative to each other can be achieved with a high degree of accuracy, as will be discussed with respect to FIG. 4, the vector is used to determine the exact position in which the sensors are in alignment, and the alignment system is operated accordingly. To achieve subpixel accuracy in the position vector, interpolation of the cross correlation function is employed in the vicinity of the global maximum to estimate the true peak location and the sensor being aligned is moved in sub-pixel increments. To avoid edge effects in the rotated image, the rotated image is windowed such that the edges are outside the window border.

If the numerical accuracy of the rotation calculations is insufficient, small rotational misalignments may be difficult to detect with this technique and interpolation in the rotational ($\theta$) axis may be sensitive to noise. If this is the case for a particular sensor, then once the gross rotational misalignment is corrected, an alternative method can be utilized where the cross correlation function is calculated at points in the neighborhood of the peak, the sensor under alignment is rotated slightly (in a subpixel increment), a new cross correlation function is computed, and the process is repeated until the global maximum is found. In certain situations it is also possible to perform such a peak hunting operation, in which the sensor is actually physically moved, in place of the mathematical rotation sequence illustrated in FIG. 2. The preferred mathematical rotation type procedure will be discussed in more detail with respect to FIG. 5.

The behavior of the cross correlation function depends on the target image content. A well defined, single peak of narrow width in the autocorrelation function of the sensor signal denotes that adjacent samples in the image are relatively uncorrelated and the cross correlation function will be very sensitive to the different sample locations in the image plane for the two sensors. Thus, an important feature of the invention is the type of target 16 to be used. An ideal target 16 has the following qualities: 1) A two dimensional distribution of reflective (or transmissive) areas in the target is either at regular intervals or at random locations. 2) For each reflective (or transmissive) area in the target a predetermined probability exists of having a reflectance (or transmission) between the minimum or maximum reflectance or transmission obtainable with the medium. 3) The property that the periodic autocorrelation function of the targeted image data from an ideal sensor in the image plane at any sensor tilt angle $\phi$, horizontal position x, and vertical position y, 4) The spectral response of each reflective or transmissive area over the range of wavelengths to be detected by the sensors is related to the spectral response of any other area by a scalar. 5) The target, as sensed by the sensors, has subpixel features, which can be accomplished by placing the target at an appropriate distance from the lens. Such a target is illustrated in FIG. 3.

The target of FIG. 3, which has all the characteristics above, if the target is an appropriate distance from the lens, will promote: 1) The 2-dimensional autocorrelation function of any sensor output or the cross correlation of the outputs of two perfectly aligned sensors will be as near an impulse as possible, with one prominent global maximum. 2) The signals generated by any two perfectly aligned sensors sensitive to different wavelengths will be linearly related. The target of FIG. 3 has the quality that the reflective areas have a 50% probability of being either maximally or minimally reflective. However, other probability density functions could be used, such as the uniform or Gaussian distributions.

To generate such a target a computer program that generates a random number sequence is used. The number sequence is generated with the desired distribution (uniform, Gaussian, etc.). Once generated the numbers are converted into pixel values and arranged in an array by filling the rows of the array with the sequence of numbers in the order generated. The pixel values are then printed onto the appropriate medium by a conventional printer. The target of FIG. 3 was printed on a conventional laser printer. A picture of a TV screen producing an image on an unused channel or a picture of photographic film grain could also satisfy some of the desired characteristics.

Figure 4:
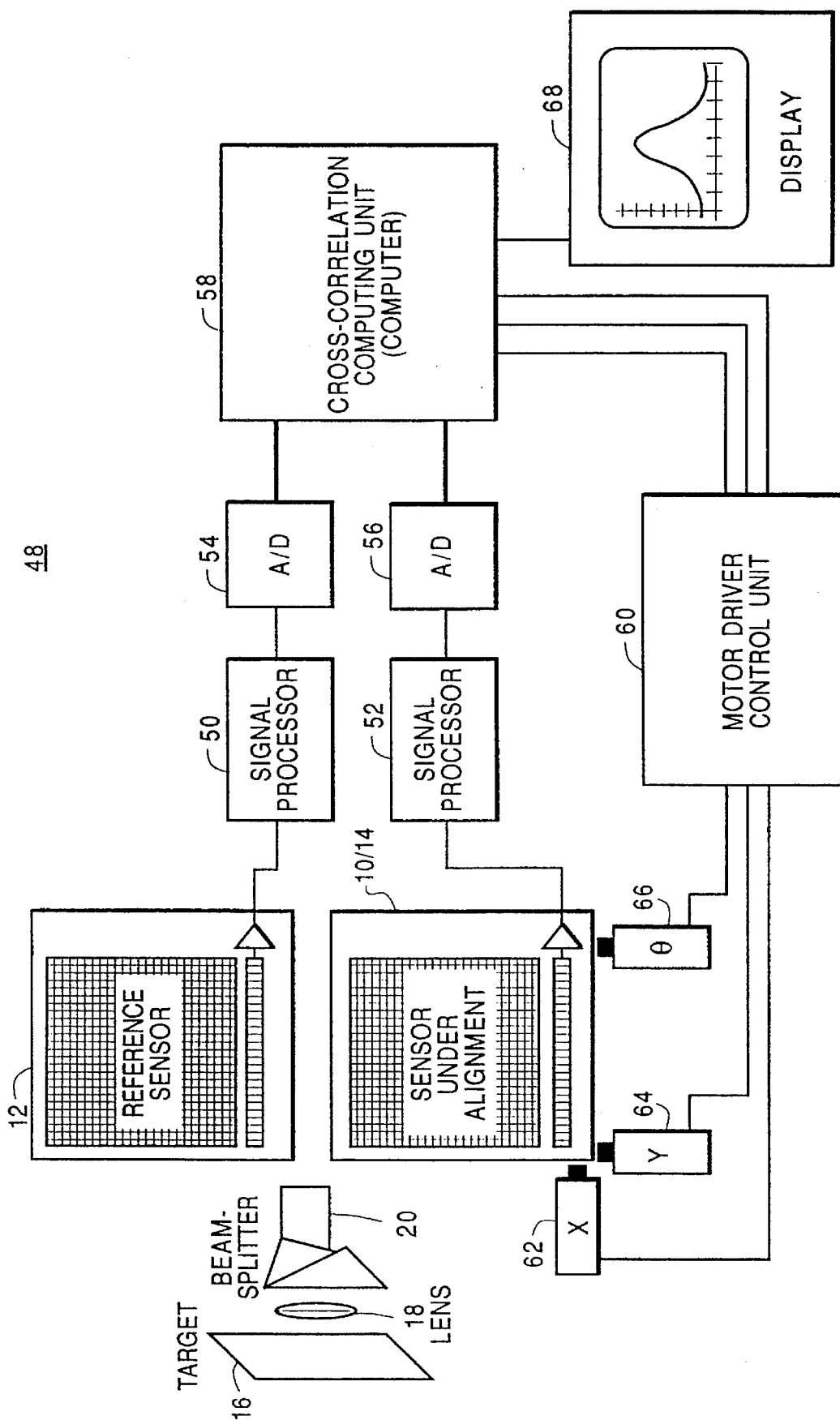
FIG. 4 illustrates the components of an alignment system 48 according to the present invention.

As illustrated in FIG. 4, the alignment system 48 of the present invention includes conventional signal processors 50 and 52 which condition the signal produced by the sensors 10, 12 and 14 by, for example, performing well known amplification, correlated double sampling and white balance. The output of the signal processors 50 and 52 is converted into digital samples of, for example, 8 bits each by analog to digital converters 54 and 56 and provided to a cross correlation computing unit 58 which is preferably a computer such as a Sun 4 series workstation. As previously mentioned, the computer calculates a translation and rotation vector which is converted into the coordinate system of the sensor 10-14 being aligned and used to control a motor drive control unit 60 which causes motors 62, 64 and 66 in an alignment fixture or jig to move the sensor 10/14 to the desired location where the misregistration error is most reduced. A suitable motor drive control unit 60 and motors 62, 64 and 66 capable of subpixel motion increments (1/10 micron) are available from Kilinger Scientific of Garden City, N.Y. It is also possible to provide a display 68 which can be used to provide a output similar to the rotational slices of FIG. 2 which would graphically illustrate the point of registration between the images produced by the sensors.

Figure 5:
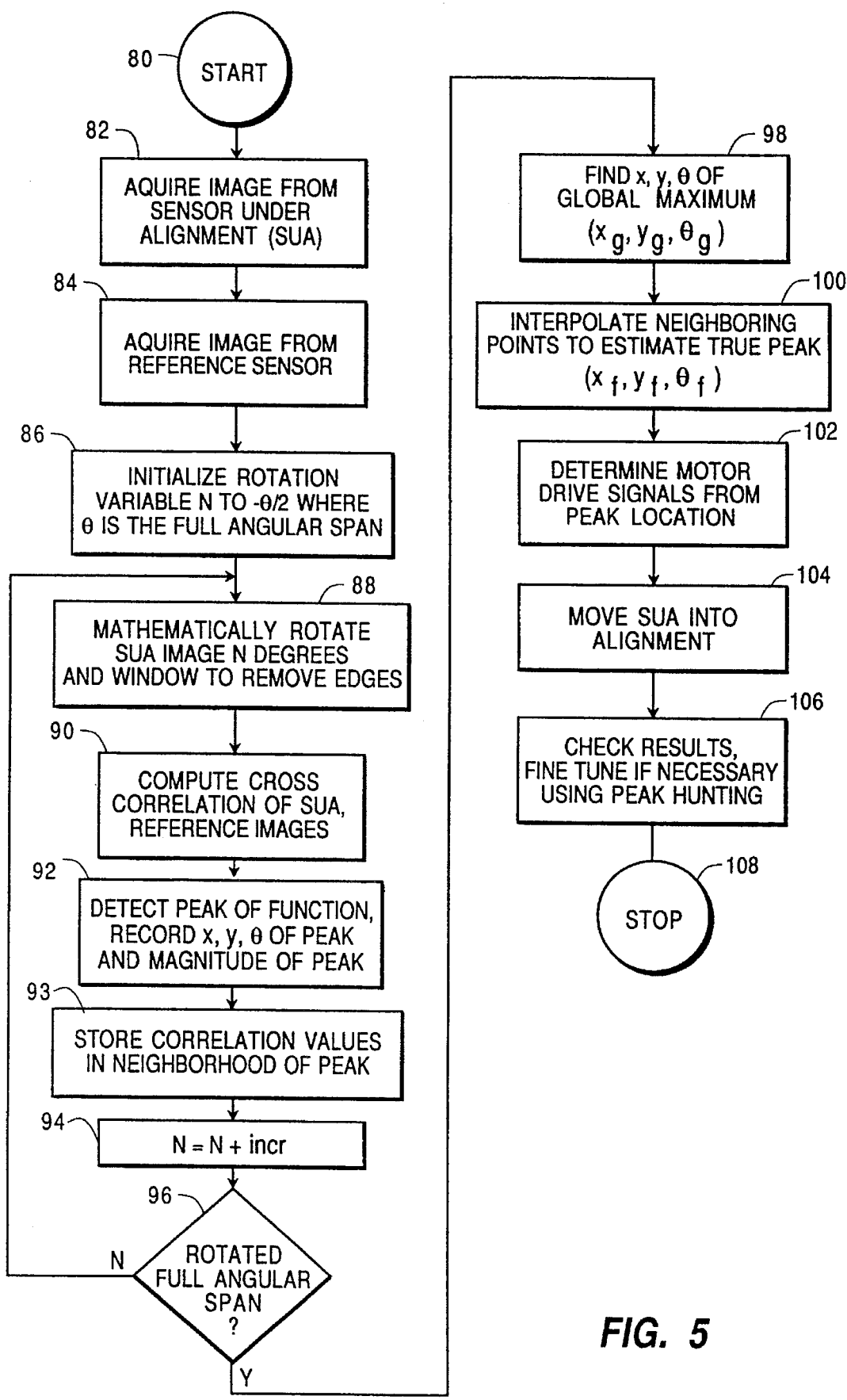
FIG. 5 is a flowchart of the process performed by the computer 58 in FIG. 4.

The computer 58 of the alignment system 48 of FIG. 4 starts, as illustrated in FIG. 5, by acquiring 82 and 84 the images from the reference sensor 12 and the sensor 10/14 under alignment. The system then initializes a rotation variable. For a mega-pixel sensor, such as the KAI-1000 sensor available from Eastman Kodak Company, Rochester, N.Y., a rotation angle ($\theta$) of two degrees in increments of 0.1 degrees would be appropriate. Other sensors may require different angles and increments to obtain adequate rotational sampling. The system then enters a loop in which the cross correlation is performed for each rotational increment. The image from the sensor being aligned is rotated 88 to the appropriate position by translating the image sufficient to accomplish the rotation desired. Next, the system computes the cross correlation between the images of the sensor being aligned and the reference sensor. This step is very computationally intensive as can be understood from equation 4 set fourth previously. A brute force computation, as would be understood by a person of ordinary skill in the art, of equation 4, involves a loop within a loop during which the image is shifted by one pixel in the X direction and the product of corresponding pixels is accumulated and stored. This stored result provides one point in the two dimensional cross correlation function or output. This loop is continued until the image has been shifted and points in the function stored in, for example, the X direction throughout the range required by equation 4. Then the image is shifted in the outer loop by one pixel in the orthogonal direction, for example, the Y direction. The system then enters the X pixel shifting and accumulating loop and computes another series of points of the function. The output is a series of correlation values that have both X and Y coordinates associated with them. If these values are stored in an array in which the row and column of the array correspond to the X and Y positions of the pixels in reference image, then the row and column indices of the maximum value is the peak in the correlation between the reference sensor and the sensor being aligned.

Once the two dimensional cross correlation between the rotated images is obtained, the stored results (the array) are scanned 92 to detect the peak in the function and the translational position and the rotational position of the peak are recorded. A three dimensional neighborhood of cross correlation values centered at the peak is stored 93 for later interpolation. The same neighborhood is used for subsequent iterations. The system then increments 94 the rotational variable. The system then determines whether the rotational variable indicates that a full rotational span has been completed. If not, the loop is executed again. If the full rotational span has been completed, the stored peak results of the rotations are scanned 98 to determine the global maximum in the peak which is an integer value of array row and column and a real value of the rotational angle. The system then performs a conventional linear interpolation with the correlation values in the three-dimensional neighborhood of the peak and determines the true peak. The number of points stored on each side of the peak depends on the nature of the interpolation used and at least a interpolation should be used. This step produces the subpixel alignment.

Once the true peak is determined, the shift of the sensor is calculated as a shift vector. This step involves using the real or fraction row and column location of the interpolated peak to calculate X and Y movement distances to the center of the image sensor and the movement distance necessary to perform the desired rotation. The shift vector is used to determine the drive signal values for the motors 62, 64 and 66. The drive signal values are applied to the control unit 60 to move the sensor into alignment. The next step 106 is an optional step during which the steps 82–100 can be performed again to check the alignment movement. Alternatively, a conventional peak hunting approach can be use to find tune the alignment. Once the sensor is moved into its final position, it is fixed in place by, for example, gluing the sensor to the beam splitter.

The above description of the present invention described the computation of the cross correlation in step 90 using a simple brute force computation in which the individual image pixels from the sensors are multiplied and then summed. This direct multiplication computational approach is the least computationally efficient for images such as the preferred test target, because an M by N image would require $M^2 \times N^2$ multiplications. A computationally more efficient approach is to have the discrete Fourier transform of each image produced, the transformed images multiplied and then produce the inverse transform of the product. This requires approximately MN $(1+1.5 \log_2(MN))$ complex multiplications, which is a significant reduction over the brute force approach. A still more computationally efficient and preferred approach is to perform a differential cross correlation of the form:

$$c=\Sigma\Sigma|f-g| \qquad (5)$$

This approach requires no multiplications. However, instead of a peak, the system would produce a minimum when the correlation is the greatest.

The above discussion included the computation of the correlation for the entire image with zero padding around the image. In many cases, the initial misregistration might be confined to a relatively small region corresponding to the center of the cross correlation matrix. For example, the alignment jig might allow an initial misalignment of only +/- 10 pixels both horizontally and vertically. In such a situation, it is not necessary to compute the correlation function anywhere outside a 20×20 window centered at the origin of the correlation function. When such a situation consistently exists, the number of calculations necessary for a correlation could also be substantially reduced.

Because of the lateral chromatic aberrations of real camera lenses and beam splitters, it is impossible to perfectly register the images from multiple sensors 10, 12 and 14 over the entire field of the image. The sensor alignment technique described herein minimizes the overall amount of image misregistration, and typically provides good registration in the center of the field. However, the corners of the field can exhibit significant misregistration. A technique for reducing the misregistration in the corners of the field or image will be described in detail with respect to FIGS. 6–8. In this technique the image is divided into many small regions of similar size, and the cross correlation function described earlier (without rotation) is computed for each of the regions. The results of the correlation function indicate the relative misregistration of the two sensors in the region used for the computation. This information is then used to calculate appropriate delays and filter coefficients for a 2-dimensional interpolator circuit which shifts the image pixels of the second sensor in the region of the image locally or regionally to further reduce misregistration errors between the two images.

Figure 6:
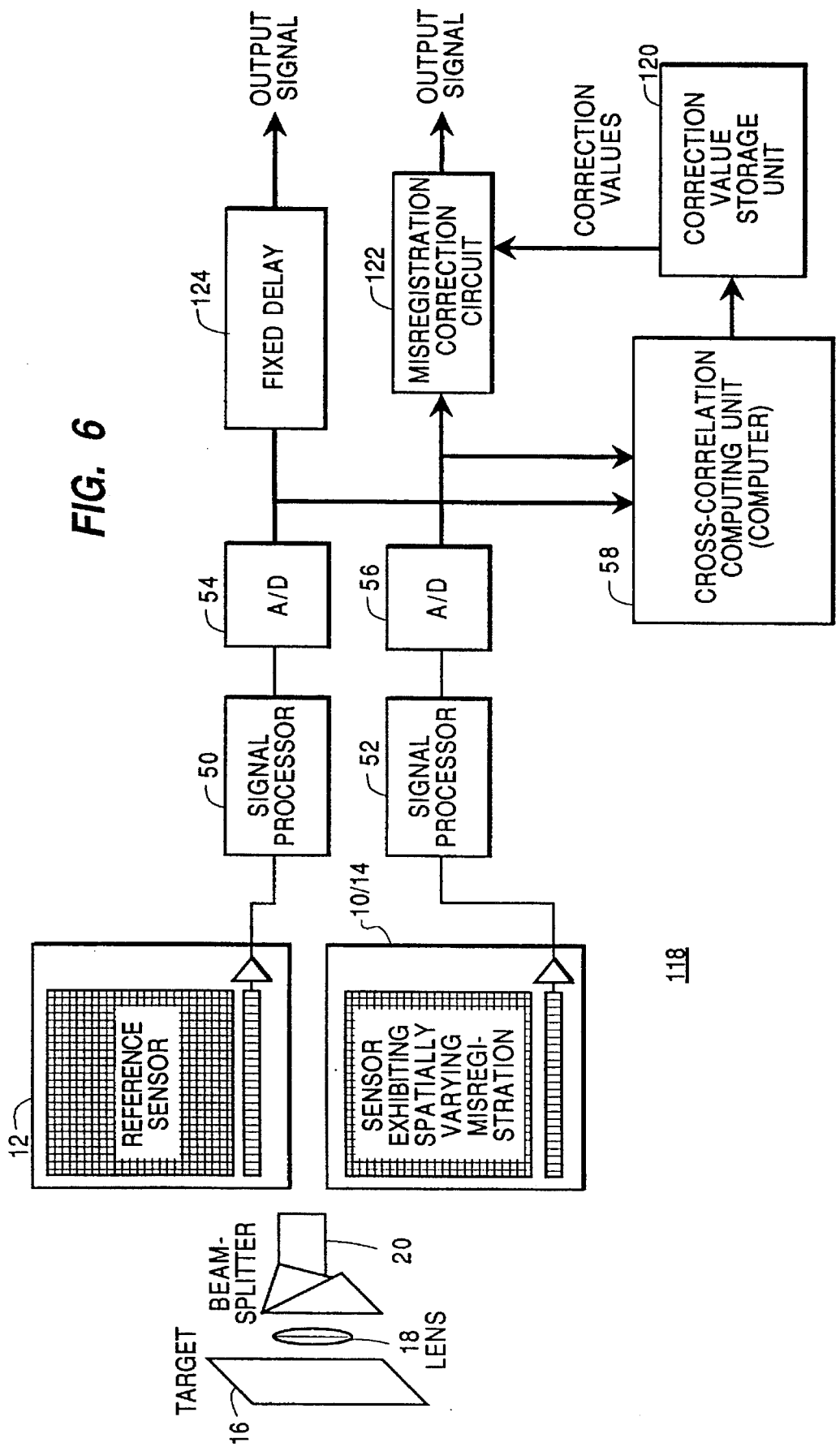
FIG. 6 illustrates a system 118 which corrects spatially varying misregistration errors.

FIG. 6 illustrates a system 118 which is a modified version of the system 58 of FIG. 4 and which, once the sensor being aligned is fixed in place, corrects for regional or spatially varying misregistration errors. The cross correlation computing unit 58 of this embodiment performs regional or localized correlations between the images produced by the reference sensor 12 and the aligned sensors 10–14. The regional cross correlation maxima are used to compute delay values and interpolation coefficient values which are stored in a correction value storage unit 120 which is preferably a permanent storage device, such as an ROM. After the correction values are determined and when the imaging system is incorporated into a device, such as a camera, the cross correlation computing unit 58 is removed and the values in the storage 120 are used to provide correction values to a misregistration correction circuit 122 which, in association with a fixed delay unit 124, performs a real time interpolation of the outputs from the aligned sensors 10–14 as the image is being sampled in the device, such as a camera.

Figure 7:
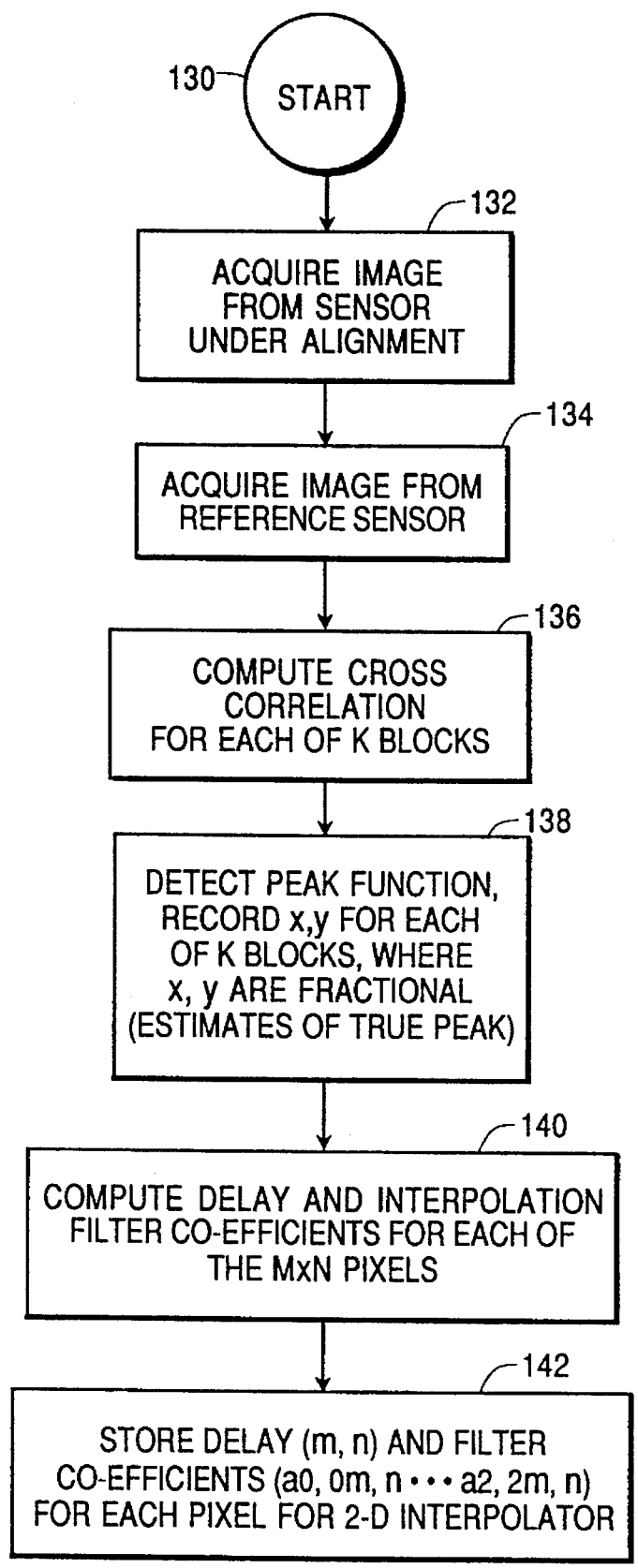
FIG. 7 is a flowchart of the process performed by the computer 58 in the system of FIG. 6.

The process performed by the cross correlation computing unit 58 of FIG. 6 is illustrated in FIG. 7. The steps 132 and 134 are identical with the steps 82 and 84 in FIG. 5. Once the images from the sensors are obtained, the image is divided into a number K of blocks, where each block can be, for example, 16×16 pixels. The dimensions of the block need to be chosen based on the optics of the system so that the aberrations do not vary significantly within the block or are isotropic within the region of the image inside each block. These blocks can be located adjacent to each other and be of uniform size. It is also possible to use overlapping blocks or to use different size blocks in different regions of the image, for example, in the center and corner regions. The entire sensor could also be blocked. For each of the blocks, the cross correlation is computed 136 in a manner similar to steps 88–96 of FIG. 5. Next, the system determines 138 the peak of the cross correlation function for each of the blocks by performing steps 98 and 100 of FIG. 5. The system then computes a delay value and interpolation filter coefficients for each of the blocks of pixels and stores 142 these values in correction value storage unit 120. The fixed delay provided by unit 124 is set at a delay equal to the maximum expected misregistration value for any of the K blocks.

Figure 8A:
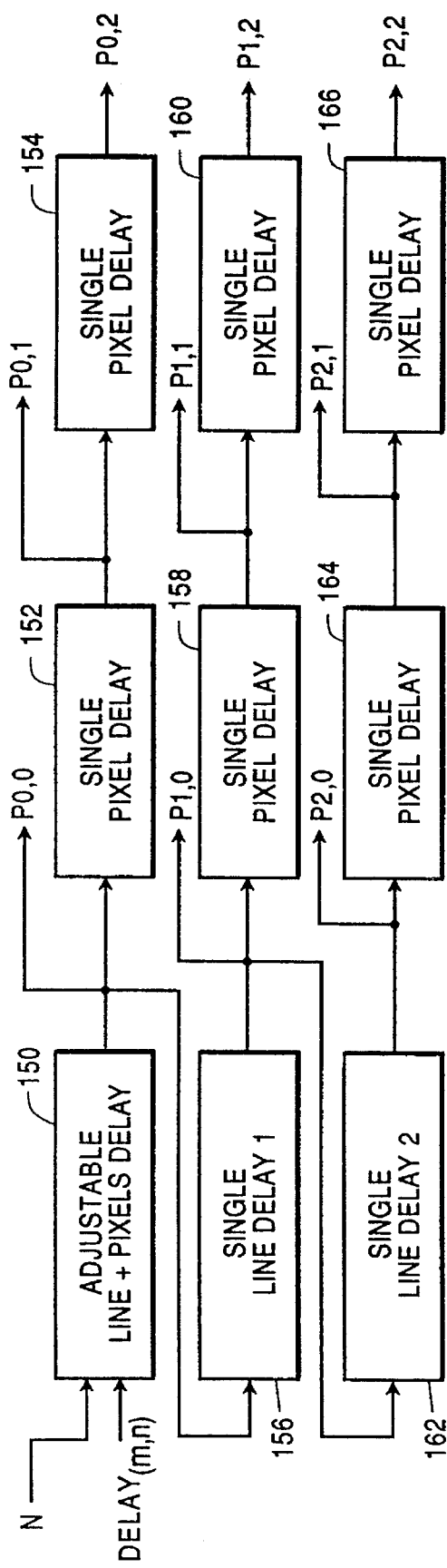
FIGS. 8A and 8B depict the details of a correction circuit 122 of FIG. 6.
Figure 8B:
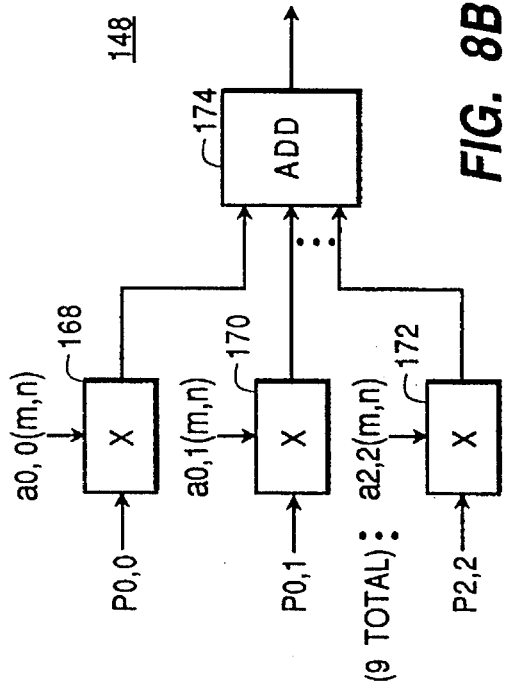

FIG. 8 (including FIGS. 8A and 8B) illustrates the components of the misregistration correction circuit 122 in FIG. 6 including a two dimensional 3×3 interpolator 148. This correction circuit 122 also includes a delay unit 150 which is capable of providing an adjustable multiple line delay plus an adjustable multiple pixel delay for the pixel values from A/D 56 in FIG. 6. This unit supplies an output to a single pixel delay unit 152 which supplies another single pixel delay unit 154. The unit 150 also supplies a single line delay unit 156 which feeds serially single pixel delay units 158 and 160. The single line delay unit 156 also supplies an output to single line delay unit 162 which serially feeds single pixel delay units 164 and 166. The outputs of the delay circuits 150–166 are supplied to a total of nine multipliers, three of which are shown as multipliers, 168–172 which multiply the delayed pixels by the nine filter coefficients stored in the storage unit 120. The outputs of the multipliers 168–170 are added by a conventional adder 174 and output as the real time misregistration error corrected signal.

Figure 9A:
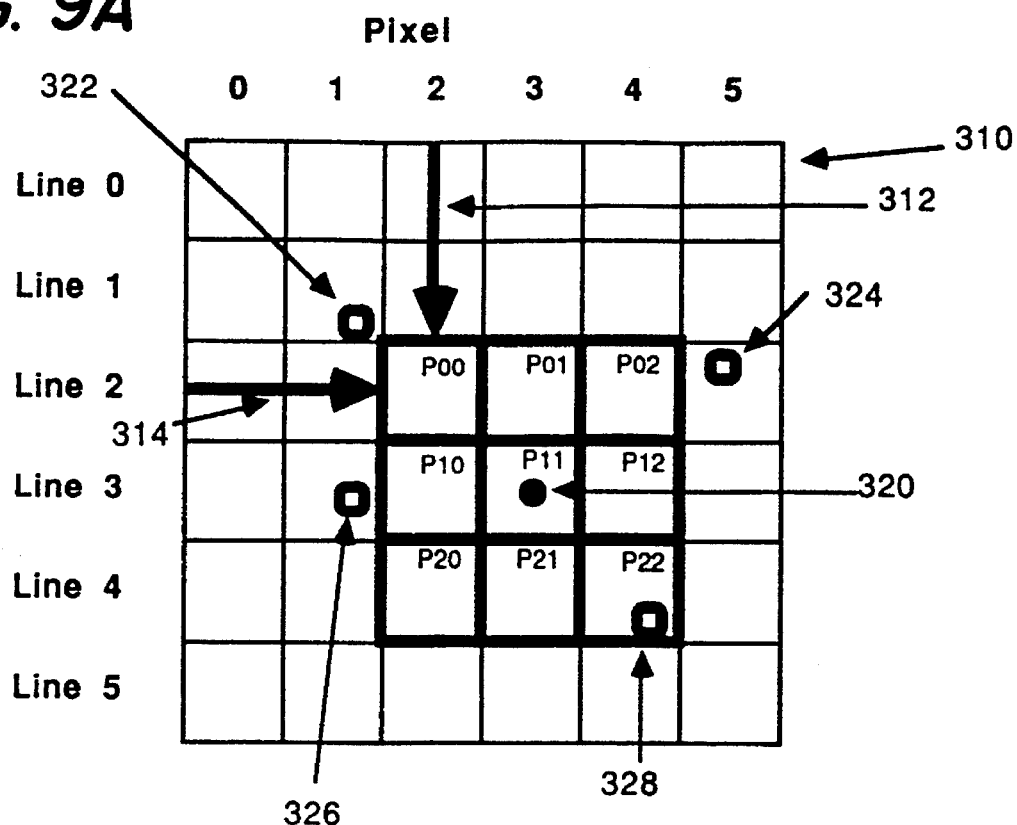
FIGS. 9A and 9B illustrate spatially varying misregistration error correction.
Figure 9B:
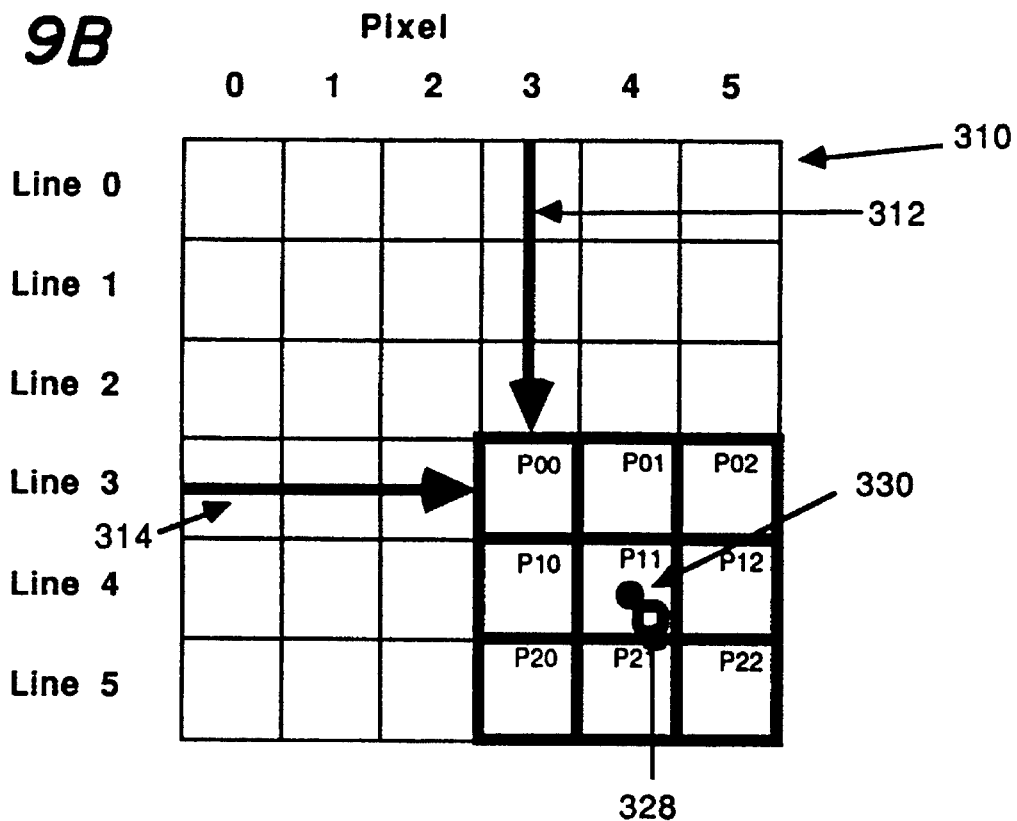

The operation of the misregistration correction circuit 122, by which the spatially varying misregistration errors are corrected for each block of pixels, will be described with reference to FIGS. 9A and 9B. FIG. 9A shows a two-dimensional grid of photosites 310, with the rows numbered as lines 0 to 5, and the columns numbered as pixels 0 to 5. The grid is used to graphically show the relative differences in the correlation peaks between the reference sensor 12 in FIG. 6 and the sensor 10 or 14 exhibiting spatially varying misregistration errors relative to reference sensor 12. The 3 line×3 pixel darkened grid 310 shows the spatial locations of the pixels P 0,0 to p 2,2 provided to the inputs of multipliers 168–172 in FIG. 8, when an adjustable delay value of two lines (indicated by arrow 312) plus two pixels (indicated arrow 314) is used. The dot 320 in FIG. 9A shows the location of the correlation peak position for exact alignment of the two sensors. In general, the correlation peaks for each of the blocks of pixels in the different regions of the image will usually not coincide with dot 320, but will instead be scattered at nearby locations, for example at dots 322, 324, 326 and 328, which represent the correlation peaks of four different blocks of pixels in different areas of the image.

If, for a given block of the image, the correlation peak position does exactly coincide with the reference sensor correlation peak 320 (that is, the two sensors are well registered in this region of the image), and the fixed delay 124 in FIG. 6 equals 3 lines plus 3 pixels (to allow for correction of errors up to ± three lines in the vertical direction and ± three pixels in the horizontal direction), the circuit of FIG. 8 operates as follows. The delay value to adjustable delay 150 in FIG. 8 is set to be equal to 2 lines plus two pixels, and the coefficients P0,0 to P2,2 are all set equal to zero, except for coefficient P1,1, which is set equal to unity. This provides an additional 1 line plus 1 pixel delay. Therefore, the total delay provided by misregistration circuit 122 in FIG. 6 equals 3 lines plus 3 pixels, which exactly matches the delay provided by fixed delay 124. These delay and coefficient values will be used for all pixels of the block.

For blocks where the correlation peak position does not match the reference sensor correlation peak, the settings of the adjustable delay value and the coefficients P0,0 to P2,2 will be set to compensate for this difference. This is done in two steps. The first step is to properly set the adjustable delay value, which allows the misregistration to be corrected within a distance equal to the pixel pitch of the sensor. This is shown graphically in FIG. 9B. The adjustable delay value has now been set to three lines (indicated by arrow 312) plus three pixels (indicated by arrow 314). This centers the 3×3 interpolation circuit "window" over the correlation peak 328 of this block. The second step is to correct for the subpixel sized difference between the location of correlation peak 328 and the center of the pixel indicated by dot 330. This correlation is done by properly setting the values of the interpolation coefficients P00 to P22. The techniques used to calculate such interpolation coefficients are well known in the art, being described, for example, in 37 Digital Image Processing" by William K. Pratt, John Wiley & Sons, New York, 1978, incorporated by reference herein.

Figure 10:
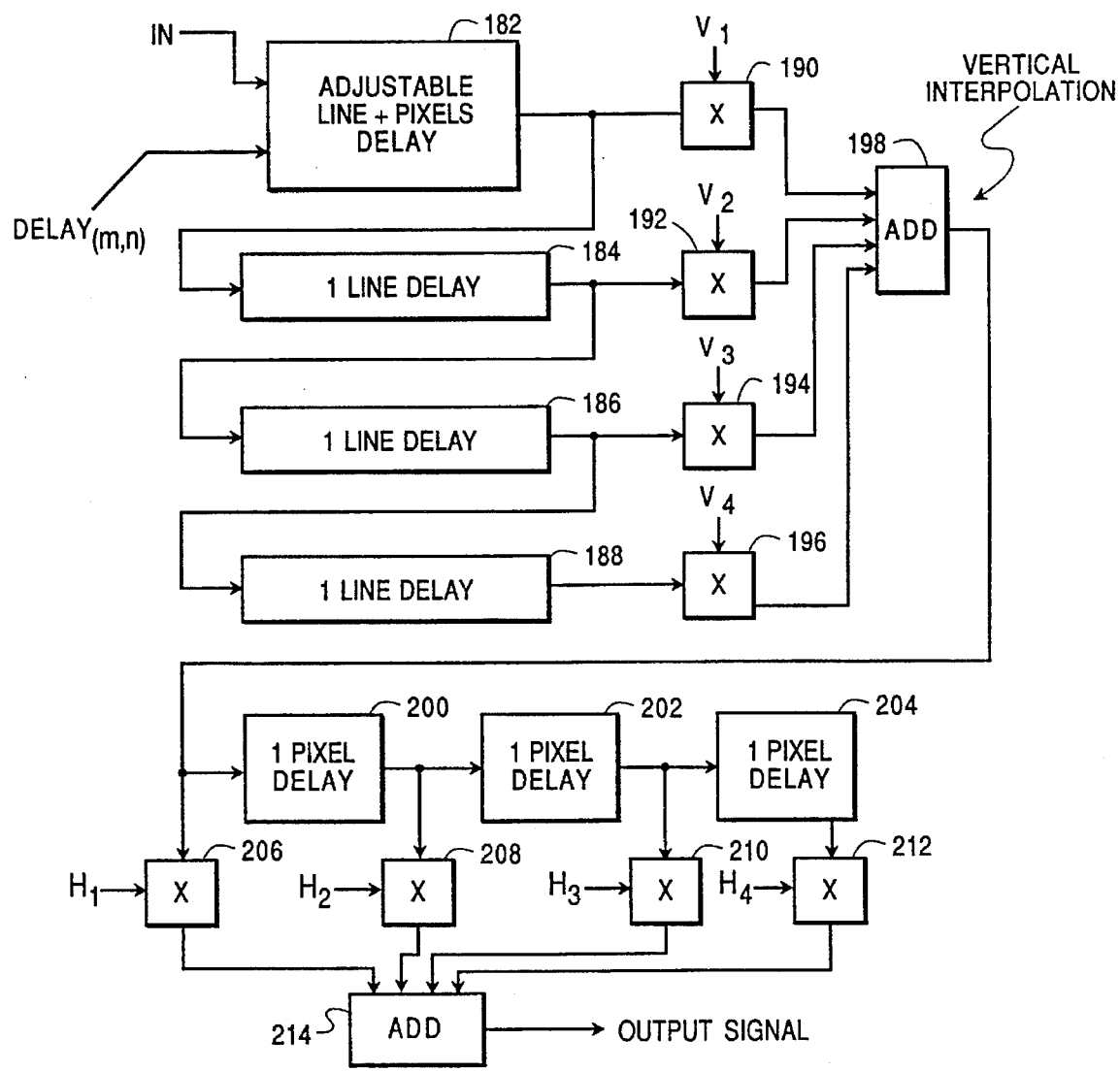
FIG. 10 illustrates a 4×4 filter.

The previous interpolation method and apparatus performed a 3×3 two-dimensional interpolation using a nonseparable kernal. A preferred approach to subpixel misregistration correction is to use coefficient bins to create coefficients for a seperable 4×4 interpolation filter. In this approach, the steps 140 and 142 of FIG. 7 would compute and store delay and X, Y bins for each of the pixel blocks. Interpolation with coefficient binning is discussed in detail in "Resampling Algorithm for Image Resizing and Rotation" by Ward et al., SPIE Proceedings Vol. 1075, pages 260–269, 1989, incorporated by reference herein. Once the coefficients are determined, a circuit as illustrated in FIG. 10 can be used. This misregistration correction circuit 180 includes an adjustable delay unit similar to the adjustable delay 150 in FIG. 9 and three single line delay units 184–188. These units output to multipliers 190–196 which apply the vertical interpolation coefficients ($V_1$–$V_4$) to the delayed pixel values. An adder 198 sums the multiplier output to provide a vertical one dimensional interpolation. The vertically interpolated signal is then supplied to pixel delay units 200–204. The vertically interpolated pixel value and the outputs of the pixel delay units 200–204 are applied to multipliers 206–212 which apply the horizontal coefficients ($H_1$–$H_4$). The adder 214 sums the multiplier outputs and produces horizontally interpolated pixel values.

Figure 11:
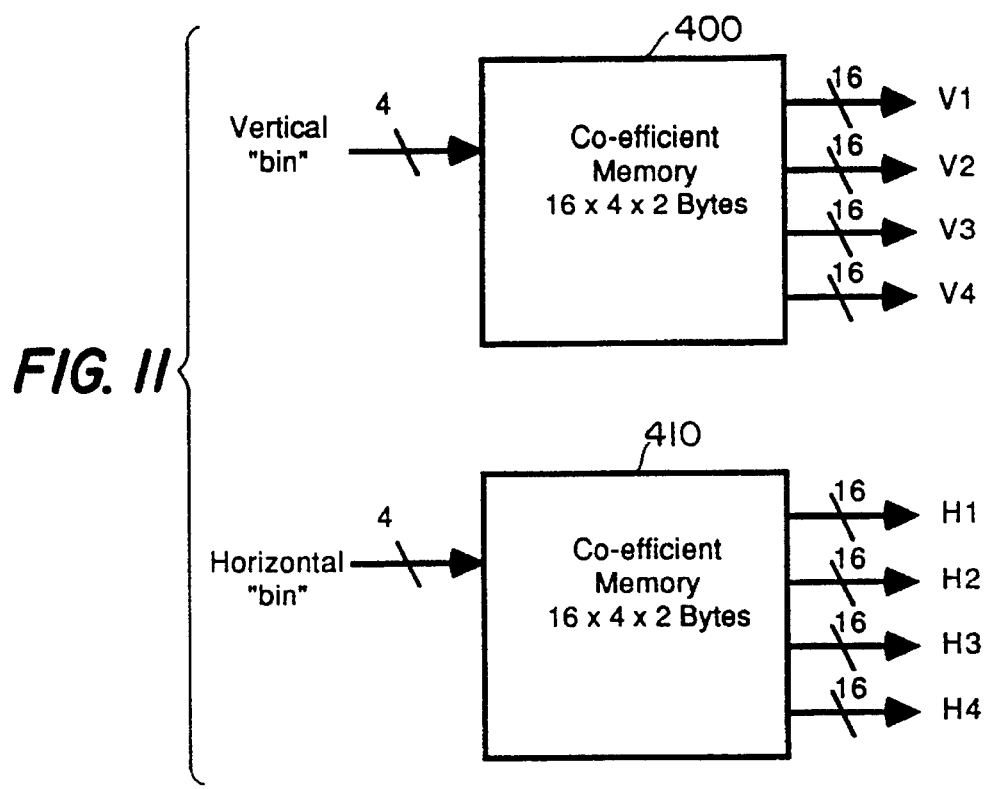
FIGS. 11–13 illustrate filter coefficient binning.
Figure 12:
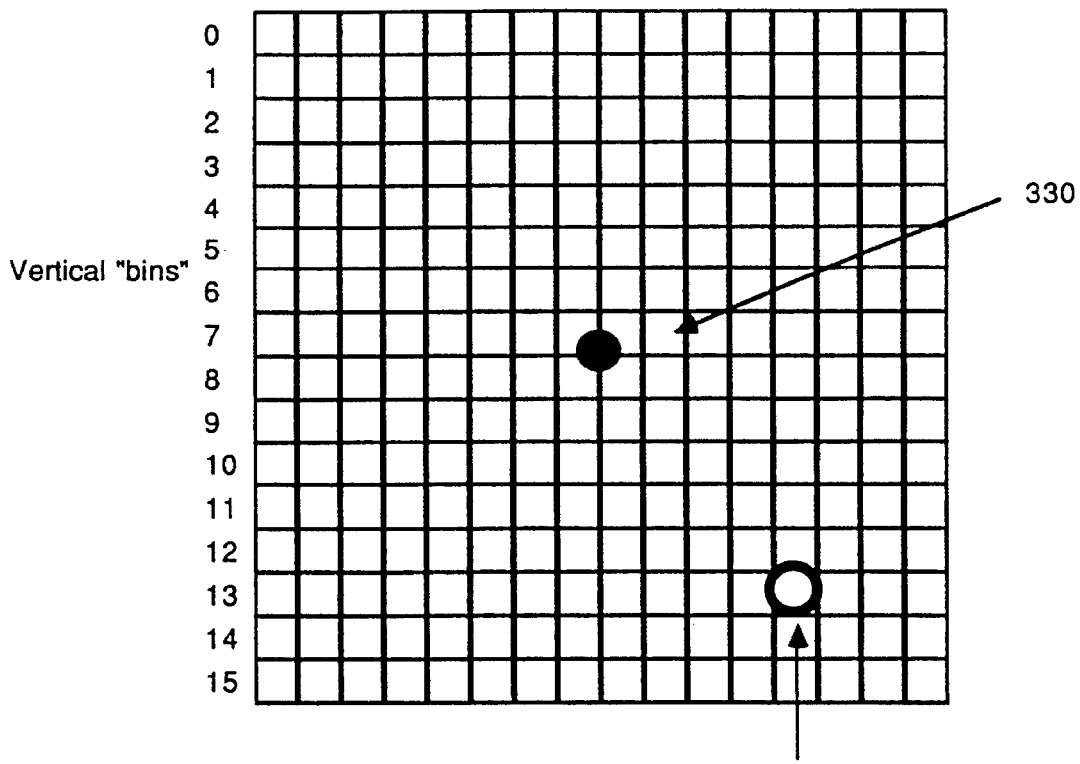

The filter coefficients $V_1$–$V_4$ and $H_1$–$H_4$ are provided by the coefficient memories 400 and 410 shown in FIG. 11. The memories are shown as Read Only Memory (ROM) circuits, each with four input address lines and four 16 bit output lines which provide four coefficients values. For each block of pixels, therefore, only the 4 bit vertical "bin" and 4 bit horizontal "bin" values need to be stored, instead of the actual coefficient values. This significantly reduces the amount of memory required. FIG. 12 shows how the binning technique is used to correct for the subpixel sized difference between the location of correlation peak 328 and the center of the pixel indicated by dot 330, as opposed to the technique described earlier with respect to FIG. 8. The area within a pixel is divided into 16 horizontal and 16 vertical pixel "bins". The correction of the pixel block having correlation peak 328 is accomplished by storing in memory 120 of FIG. 6 the horizontal "bin" value (equal to 12) and the vertical "bin" value (equal to 13), as well as the appropriate value for the adjustable delay 150. When the pixels of the block having correlation peak 328 are processed by the circuit in FIG. 10, the stored horizontal and vertical bin values are used to address memory 400 which provides the correct coefficient values $V_1$–$V_4$ and $H_1$–$H_4$ to circuit 180.

There are two advantages to the misregistration correction circuit shown in FIG. 10 relative to the circuit shown in FIGS. 8A and 8B. First, the use of "binning" allows less memory to be used to store the correction values for each block. Second, using separable interpolation filters reduces the number of multipliers required.

Figure 13:
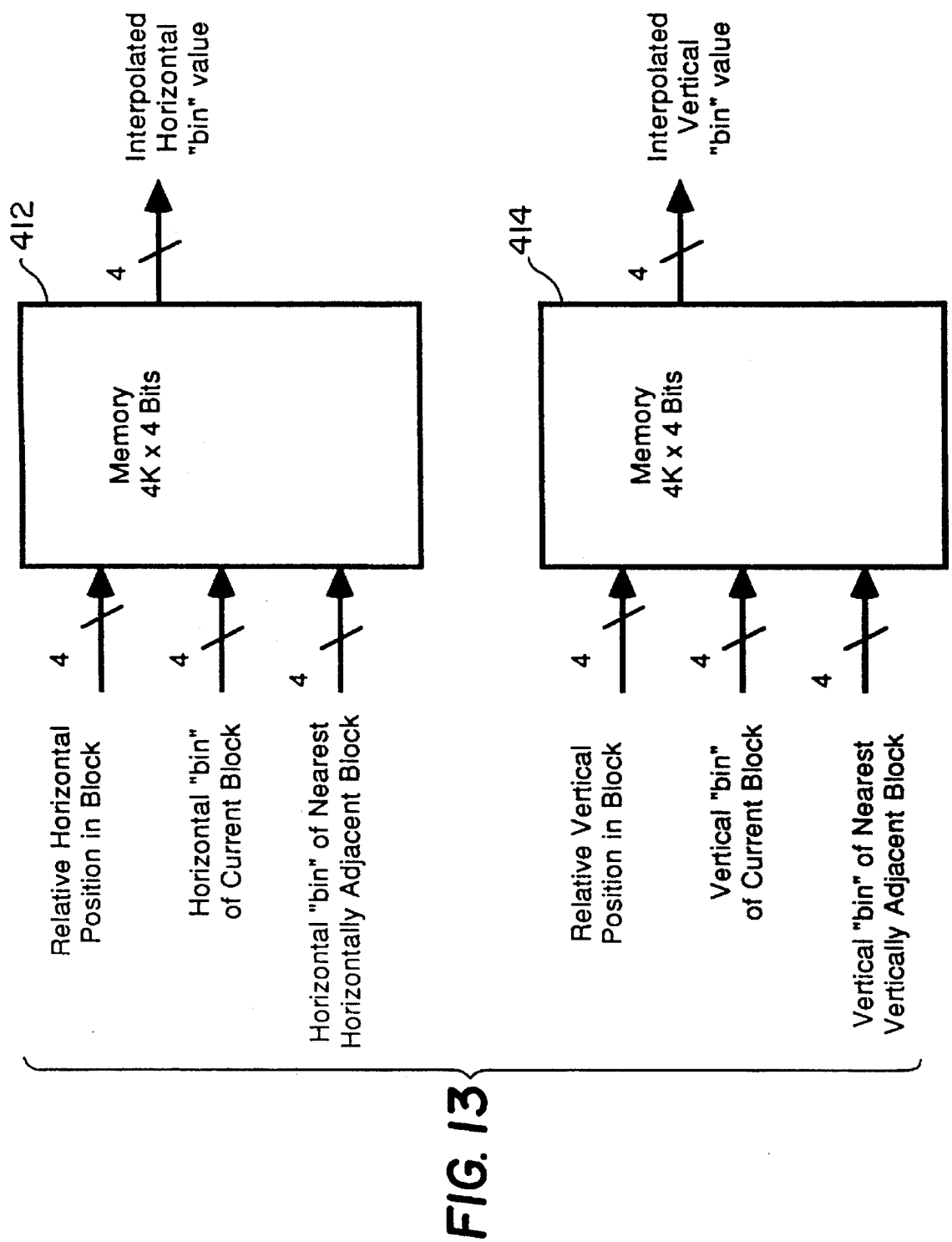

If the pixel blocks used to perform the regional cross correlation function are large enough so that misregistration changes within a block are significant, the misregistration cannot be perfectly corrected using the techniques described so far. One way of correcting the misregistration is to use smaller blocks. However, this increases the size of the correction value storage 120 in FIG. 6, and decreases the precision of the cross correlation function. A preferred approach is to interpolate new misregistration correction values for all the pixels in the image using the misregistration values computed for the nearest adjacent pixel blocks. FIG. 13 shows one possible implementation, where the relative horizontal position within a block and the values of the current block's horizontal "bin" and that of the nearest horizontally adjacent block are used as addresses to a lookup table (ROM 412) providing a linearly interpolated horizontal "bin" output for every pixel, and the relative vertical position within a block and the values of the current block's vertical "bin" and that the nearest vertical adjacent block are used as addresses to lookup table (ROM 414) providing a linearly interpolated vertical "bin" output of every pixel.

Variable focal length (i.e., Zoom) lenses typically have chromatic aberrations which vary as a function of focal lengths. Therefore, when the lens 18 in FIG. 6 is a zoom lens, the correlation computing unit 50 performs the regional cross correlations for a number (for example 16) different zoom settings. The correction values for each zoom setting are stored in correction value storage 120, and the correction values closest to the actual zoom setting at any given time are applied to circuit 122.

Although the circuits shown in FIG. 6 have used the cross correlation function to determine the relative misregistration between different blocks in the image, other techniques could instead be used to determine the misregistration values. The present invention has been described with respect to performing a cross correlation between the images of the target produced by the sensors. The use of the differential cross correlation is preferred, however, other correlation type functions could be used. If a zoom lens were substituted for the fixed lens as previously mentioned a different set of correction values is necessary for each different magnification and correction values closest to the actual zoom setting are preferably used. However, the correction values between the zoom settings could be produced by linear interpolation.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

We claim:

1. An image sensor alignment system, comprising:
   a reference sensor producing a reference image from viewing a target;
   an alignable sensor producing an alignable image from viewing the target;
   alignment correlation means for determining a multidimensional correlation between the reference image and the alignable image by performing a rotation-translation correlation simultaneously and determining a highest correlation as the alignable image is rotated with respect to the reference image; and
   sensor alignment means for moving the alignable sensor into alignment responsive to the correlation and producing aligned sensors.

2. A system as recited in claim 1, further comprising:
   correction means for determining segmented cross correlations between images produced by the aligned sensors; and
   interpolation means for interpolating one of the images after sensor alignment responsive to the segmented cross correlations.

3. A system as recited in claim 2, wherein said correction means performs a translation cross correlation for each segment.

4. A system as recited in claim 1, wherein the correlation comprises a correlation selected from among cross correlation, differential correlation and Fourier transform correlation.

5. An image sensor alignment system, comprising:
   a reference sensor producing a reference image from viewing a target;
   an alignable sensor producing an alignable image from viewing the target;
   alignment correlation means for determining a multidimensional correlation between the reference image and the alignable image by determining a highest correlation as the alignable image is rotated with respect to the reference image;
   sensor alignment means for moving the alignable sensor into alignment responsive to the correlation and producing aligned sensors; and
   a white noise target with subpixel features imaged by said reference and alignable sensors.

6. A system as recited in claim 5, wherein said target has reflective or transmissive areas at random locations, and when one of said sensors produces an in focus image a two dimensional autocorrelation function of the image has a rotational-translational peak.

7. An apparatus for use in image sensor alignment, said apparatus comprising:
   a target for use in correlation alignment of image sensors, said target comprising:
   a substrate; and
   white noise reflective or transmissive areas formed on said substrate and located at regular locations.

8. An apparatus as recited in claim 7, wherein said white noise areas have a spectral response for each area over a range of wave lengths detected by the sensors that is related to the spectral response of each other area by a scalar.

9. An apparatus as recited in claim 7, wherein each area has a predetermined probability of having a reflectance or transmission between maximum and minimum reflectance or transmittance values obtained on said substrate.

10. An apparatus as recited in claim 7, wherein when an in focus image of the target is produced by one of the sensors, a two dimensional autocorrelation function of the image has a prominent peak.

11. A target as recited in claim 7, wherein said areas comprise subpixel size features.

12. A system as recited in claim 7, wherein said correlation comprises a correlation selected from among cross correlation, differential correlation and Fourier transform correlation.

13. An image sensor alignment system, comprising:
   a reference sensor producing a reference image divided into blocks;
   an alignable sensor producing an alignable image divided into blocks;
   an image sensor alignment target for cross correlation alignment of said reference and alignable sensors, said target comprising:
   a substrate; and
   white noise reflective or transmissive areas of subpixel size formed on said substrate, a spectral response of each area over a range of wave lengths detected by the reference and alignable sensors is related to the spectral response of each other area by a scalar where each area has a predetermined probability of having a reflectance or transmission between a maximum reflectance or transmission obtainable with said substrate and the areas are located at random locations and when images of the target are produced by said reference and alignable sensors a periodic autocorrelation of the images when in perfect alignment has a prominent peak;

alignment correlation means for simultaneously, determining a rotational-translational correlation between the reference image and the alignable image by determining a highest image correlation as the alignable image is rotated with respect to the reference image;

sensor alignment means for moving the alignment sensor into alignment responsive to the highest image correlation and producing aligned sensors;

correction correlation means for determining correction correlations between the corresponding blocks of the image data produced by the aligned sensors by determining a highest block correlation as one of the blocks produced by the alignable sensor is shifted with respect to the corresponding one of the blocks of the reference sensor;

coefficient means for determining correction values for the corresponding blocks responsive to the correction [cross] correlations; and a coefficient bin interpolation filter correcting misregistration errors using the correction values.

14. A system as recited in claim 13, wherein said alignment correlation means and said correction correlation means perform a correlation selected from among cross correlation, differential correlation and Fourier transform correlation.

15. A method of correcting spatially varying misregistration errors of images produced by solid state image sensors, said method comprising the steps of (a) obtaining image data captured by the solid state sensors sensing a same target after sensor alignment;

(b) dividing the image data into corresponding blocks;

(c) determining a misregistration between each of the corresponding blocks;

(d) determining correction values for correcting the misregistration; and (e) interpolating image data captured by one of the solid state sensors responsive to the correction values.

* * * * *